Patented Mar. 8, 1938

2,110,745

UNITED STATES PATENT OFFICE 2,110,745

ALKALI SOLUTION OF LEAD

Alexander Stewart, Roselle, N. J., assignor to National Lead Company, New York, N. Y., a corporation of New Jersey No Drawing. Application September 27, 1933, Serial No. 691,194

3 Claims. (Cl. 23—51)

The invention relates to improvements in alkali hydroxide solutions of lead and more particularly to the concentration of lead or litharge dissolved in solutions of caustic alkali. An alkali hydroxide solution, for example sodium or potassium, containing dissolved lead is termed a plumbite solution and will be herein so called.

Plumbite solutions are made by dissolving pure litharge in hot sodium and/or potassium hydroxide solutions, for instance at about 90° C. until saturated and then allowing the solutions to cool to ordinary or working temperatures. Increasingly stronger alkali solutions will dissolve increasingly greater amounts of litharge to saturate the hot solution with lead. Sodium plumbite solutions are, as a general rule, employed in commercial practice. Up to about 12° Baumé, plumbite solutions saturated with pure lead oxide at say 90° C. will, upon cooling to ordinary temperatures, retain substantially all of the dissolved lead in solution. But stronger plumbite solutions, say of 14° Baumé and stronger, when saturated with lead at the dissolving temperature and allowed to cool to ordinary temperature of say 20° C., will allow some proportion of the dissolved lead, often as much as 70% to crystallize out of solution as substantially anhydrous lead oxide (PbO), and will then contain even less soluble lead than the 12° Baumé solution.

It is known that if a small portion of antimony such as lead antimonate or lead antimonite be present in the hot solution, the result will be that less lead will crystallize out in cooling, and in consequence more of it will remain in solution at the reduced or working temperature. I have investigated this phenomenon and have found among other things that this effect of antimony is not alone confined to that particular metal but is shared also by certain others and in particular mercury. With plumbite solutions below 12° Baumé, the addition of small amounts of this material has no appreciable effect on the amount of dissolved lead retained in either the hot or cold condition, but in higher concentrations the effect is pronounced and similar to that of antimony and it is thus available in relations where the presence of antimony may be not desired.

In general the oxides or salts of mercury, soluble or partly soluble in alkali hydroxide solutions, bring about the higher lead concentrations when used in small percentage of the lead content of the plumbite solution. They cause the formation of metastable plumbite solutions, containing in some instances up to 265% increase in soluble lead in the cooled solution, as compared to similar plumbite solutions made from pure litharge without the addition of such oxides or salts. A metastable solution is one that indicates a comparatively stable condition, which by contact with a minute particle of the stable form, may produce actual stability, as in supersaturated solutions. I prefer to use mercuric chloride in the range of from 0.03% to 1.0%.

The commercial object of my invention is to provide a plumbite solution containing a high content of lead, which solution after saturating at the dissolving temperature, will substantially retain its original high lead content at ordinary working temperatures and will be stable for all practical purposes. The working temperature may be lowered as low as zero degree and in some instances considerably lower without fear of lead crystallizing out of solution.

In practice such a solution has several commercial advantages, for example, as a sweetening agent known as doctor solution, for the treatment or refining of petroleum distillates; a plumbite solution so made is much stronger and more efficient because of its high lead content and much smaller volumes of solution are required to give the desired result as compared to plumbite solutions made with pure litharge, to which such oxides or salts have not been added.

I claim:—

1. A plumbite solution of high lead concentration, that is to say, higher than can be obtained in stable form at the same temperature with pure litharge dissolved in alkali hydroxide, said solution containing and having its lead component held in solution by virtue of the presence therein of a small portion, greater than .30% of an alkali-soluble compound of mercury.

2. A plumbite solution of high lead concentration, that is to say, higher than can be obtained in stable form at the same temperature with pure litharge dissolved in alkali hydroxide, said solution containing and having its lead component held in solution by virtue of the presence therein of a small portion of an alkali-soluble compound of mercury.

3. A plumbite solution of high lead concentration, that is to say, higher than can be obtained in stable form at the same temperature with pure litharge dissolved in alkali hydroxide, said solution containing and having its lead component held in solution by virtue of the presence therein of a small portion of mercuric chloride.

ALEXANDER STEWART.